April 20, 1965 K. J. CLEEREMAN ETAL 3,179,397
BUMPER
Filed Nov. 26, 1962
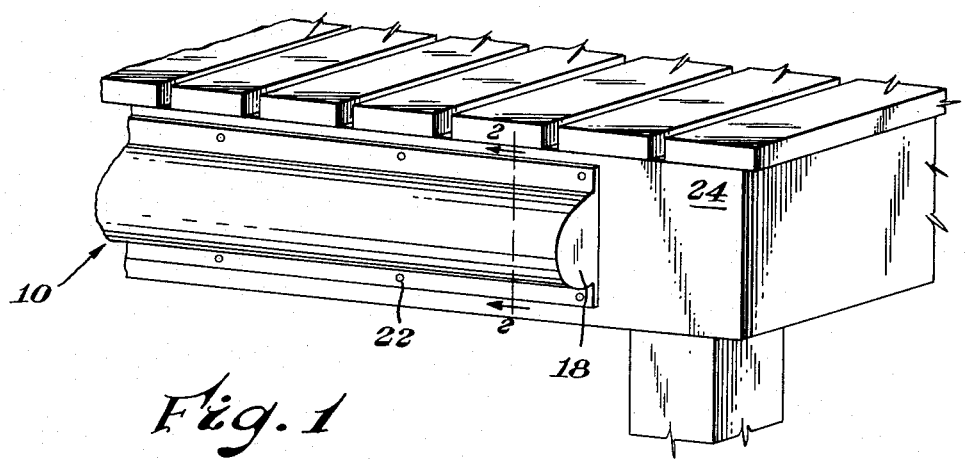
Fig. 1
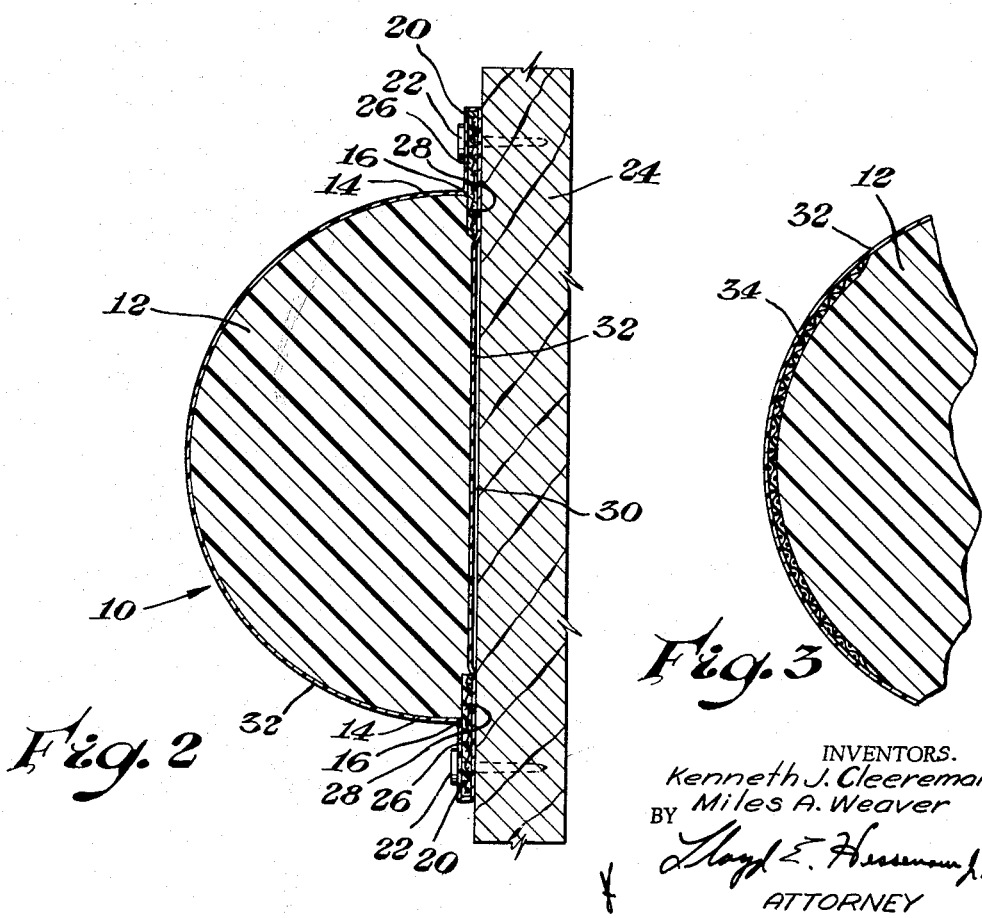
Fig. 2
Fig. 3
INVENTORS.
Kenneth J. Cleereman
BY Miles A. Weaver
ATTORNEY

United States Patent Office 3,179,397
Patented Apr. 20, 1965

3,179,397
BUMPER
Kenneth J. Cleereman and Miles A. Weaver, Midland, Mich., assignors to The Dow Chemical Company, Midland, Mich., a corporation of Delaware
Filed Nov. 26, 1962, Ser. No. 239,956
7 Claims. (Cl. 267—1)

This invention relates generally to various cushioning articles, and more particularly to an improved bumper device to be used on docks as a cushion for boats, or in other similar cushioning applications.

Many such dock bumper devices have been used in the past; a few of the more common being old tires, hoses, or other rubber tubing and the like. More recently, a dock bumper made entirely of expanded polyethylene foam has been common. However, this plastic foam bumper has had several weaknesses in that the amount of foam necessary is excessive, the bumper has poor scuff resistance such that the outer surface can be easily damaged, and it is difficult to attach the bumper to the boat docks satisfactorily. Such prior plastic foam bumpers have also suffered from the problem of oxidation in certain applications when not properly stabilized.

Accordingly, it is an object of the present invention to provide an improved cushioning device.

Another object of the present invention is to provide a novel cushioning device which requires a relatively smaller amount of material than that heretofore required.

A further object of the present invention is to provide a covering for plastic foam cushioning materials wherein an effective long-lasting cushion can be obtained with or without the use of reinforcements in the covering or between the covering and the plastic foam.

A still further object of the present invention is to provide a cushioning device, such as a dock bumper, which includes stapling strips for easy application of the cushioning device to enother structure, such as a dock.

Still another object of the present invention is to provide a plastic foam article wherein the foam does not require stabilization prior to use.

Yet another object of the present invention is to provide a cushioning device which can be attractively colored or otherwise similarly improved when desired.

Another object of the present invention is to provide a plastic foam cushion which is highly scuff resistant.

Briefly then, the present invention relates to a novel article of manufacture such as a dock bumper or other cushioning articles, comprised mainly of flexible expanded plastic including stapling strips, all of which are encapsulated in a plastic film cover or skin.

Yet additional objects and advantages of the present invention, and its numerous cognate benefits and features are even more apparent and manifest in and by the ensuing description and specification taken in conjunction with the accompanying drawing in which, wheresoever possible, like characters of reference designate corresponding material and parts throughout the several views thereof, and in which:

FIGURE 1 is a fragmentary isometric view of an installed dock bumper illustrating the present invention;

FIGURE 2 is a cross-sectional view thereof taken along reference line 2—2 of FIGURE 1; and FIGURE 3 is a fragmentary cross-sectional view of a modified dock bumper illustrating the present invention.

The dock bumper 10 of the present invention, as specifically shown in FIGURES 1 and 2, includes a semi-round cross-sectional resilient foam body 12 formed of a plastic foam and which includes side portions 14 which end at opposite edges 16, and opposite end portions 18 (only one end shown). Heat sealed to opposite lateral edges 16 of body 12 are stapling or fastening webs or strips 20 which extend beyond the outer surfaces of the body 12 to provide portions which can be penetrated by nails 22 or the like for securing the body 12 to a dock 24.

Stapling webs 20 are desirably formed from relatively thick plastic webbing and preferably reinforced by fibrous material 26 such as burlap or the like. It is best that the plastic in the webs 20 be compatible with the plastic foam.

The stapling webs 20 are preferably heat sealed to the foam body 12 such that they are depressed therein, as at shoulders 28, so as to present a relatively flat surface 30 on the bottom of the dock bumper.

Completely encapsulating the foam body 12 and stapling webs 20 is a thin plastic film skin 32, preferably made of a film compatible with the foam body 12 and webs 20, the skin being heat sealed thereto. Film skin 32 spreads load impact when objects strike the dock bumper, this preventing penetration which might otherwise occur if the foam body was not so encapsulated. Anti-oxidants can be included in the film skin thus alleviating the necessity of adding them to the foam body. Furthermore, the foam body, when painted and covered with the film skin, substantially resists paint wear and degradation. This is likewise true when the foam engaging side of the film is painted prior to encapsulation of the foam.

The dock bumper as described so far provides an adequate long lasting and effective cushion requiring no further reinforcement. However, if desired, an even tougher bumper can be provided by using other reinforcements also, either in the film skin itself or between the skin and the foam body, the latter being shown in FIGURE 3 as an example of such additional reinforcement. Here a wire screen 34 is sealed between the foam body 12 and skin 32 along the middle area of the bumper which portion is most likely to receive the greatest impact. Preferably, wire screen 34 is of a large enough mesh size that foam body 12 and skin 32 can be heat sealed to one another through the openings in the screen. Other materials, of course, can be used for reinforcement other than a wire screen. For example, burlap, nylon strands, plastic strips, etc., may equally well serve as strengthening elements for certain types of applications.

More specifically, it being understood that the following example is for purposes of illustration only and is not limiting, a dock bumper can be made of an expanded polyethylene plastic body having a cell size of from 0.5 to 1.5 millimeters, a density of from 1.9 to 2.6 pounds per cubic foot and a water absorption quality of from 0 to 0.8 pound per square foot of surface area. It can have a height of about 2 inches from the center of the diameter to its rounded apex, and have a diametrical dimension of about 4 inches.

The stapling webs 20 can then be formed of thick polyethylene film of about $\frac{1}{32}$ inch and about 1 inch wide, which can be reinforced by burlap or some other thinner material as previously described. With the stapling webs heat sealed into place with the foam body, the diametrical dimension from opposite outer edge to opposite outer edge of the stapling webs can be 5¼ inches.

The relatively thin encapsulating skin can be formed of a 0.01 inch thick polyethylene film heat sealed to the foam body and stapling webs as previously described.

Polyethylene has been found to be a plastic well suited to cushioning applications although it is understood that other plastics might likewise be used, such as other polyolefins, polyurethanes and certain copolymers for example. Polyethylene foams generally are resilient and are easily heat sealable with polyethylene films. Abrasive resistance of polyethylene films generally is more than satisfactory in such applications.

It is understood that while the above disclosed specifically designed dock bumper is of a semi-circular shape, other shapes can equally well be employed, i.e. square, rectangular, semi-oval, etc., if so desired, and still be within the concepts of the present invention. Similar designs can also be used for many other types of cushioning areas such as a protection strip around a gymnasium, as kneeling pads, as chair cushions, etc. Because of the character of the plastic encapsulating skin, it is relatively easy to provide different colors, or even embossment thereon if so desired, these advantages being unobtainable in uncovered foam products previously used.

While certain representative embodiments and details have been shown for the purpose of illustrating the invention, it will be apparent to those skilled in the art that various changes and modifications can be made therein without departing from the spirit and scope of the invention.

Accordingly what is claimed as new is:

1. A bumper comprising a body portion formed of a resilient expanded plastic material, said body portion presenting opposite lateral edges and opposite ends, a stapling web formed from a plastic film material compatible with said expanded plastic material, said stapling web being depressed into and heat sealed to said body portion contiguous with one of its lateral edges, a skin encapsulating at least part of said body portion and said web, said skin being formed of a plastic film material compatible with the plastic material of both said body portion and said web and being heat sealed thereto, whereby said bumper presents an integral unit highly resistant to damage and deterioration.

2. A bumper comprising a body portion formed of a resilient expanded plastic material, said body portion presenting opposite lateral edges and opposite ends, stapling webs formed from a plastic film material compatible with said expanded plastic material, each of said stapling webs being depressed into and heat sealed to said body portion contiguous with a respective one of said lateral edges, a skin encapsulating said body portion and said stapling webs except at the opposite ends thereof, said skin being formed of a plastic film material compatible with the plastic material of both said body portion and said stapling webs and being heat sealed thereto, whereby said bumper presents an integral unit highly resistant to damage and deterioration.

3. The bumper of claim 2, wherein said plastic material in each instance comprises a polymer of ethylene.

4. The bumper of claim 2, wherein reinforcements are embedded in said stapling webs.

5. The bumper of claim 2, wherein reinforcements are located between said body portion and said skin and are locked in place by the heat seal therebetween.

6. The bumper of claim 1 wherein a reinforcing element is located between at least a part of said skin and said body portion.

7. The bumper of claim 1 wherein said resilient expanded plastic material comprises polyethylene foam, the plastic film material of said stapling web comprises polyethylene film, and the plastic film material of said skin comprises polyethylene film.

References Cited by the Examiner
UNITED STATES PATENTS

| | | | |
|---|---|---|---|
| 1,649,166 | 11/27 | Kahil | 293—71 |
| 2,685,269 | 8/54 | Manson. | |
| 2,686,747 | 8/54 | Wurtz et al. | |
| 2,833,001 | 5/58 | Montefalco | 267—1 |
| 2,848,725 | 5/58 | Sloulin | 267—1 |
| 2,898,634 | 8/59 | Alderfer. | |
| 3,109,405 | 11/63 | Nusinoff | 114—219 |

FOREIGN PATENTS 1,133,360  11/56  France.

ARTHUR L. LA POINT, *Primary Examiner.*

MILTON KAUFMAN, *Examiner.*